United States Patent
Dong et al.

(10) Patent No.: US 10,110,013 B2
(45) Date of Patent: Oct. 23, 2018

(54) DOWNHOLE SWITCH ASSEMBLIES AND METHODS

(71) Applicant: General Electric Company, Schenectady, NY (US)

(72) Inventors: Dong Dong, Niskayuna, NY (US); Antonio Caiafa, Niskayuna, NY (US); Mohammed Agamy, Niskayuna, NY (US); Ahmed Elasser, Niskayuna, NY (US); Philip Michael Cioffi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 502 days.

(21) Appl. No.: 14/808,783

(22) Filed: Jul. 24, 2015

(65) Prior Publication Data
US 2017/0022766 A1 Jan. 26, 2017

(51) Int. Cl.
*E21B 43/12* (2006.01)
*H02J 4/00* (2006.01)

(52) U.S. Cl.
CPC .............. *H02J 4/00* (2013.01); *E21B 43/128* (2013.01)

(58) Field of Classification Search
CPC ........................... E21B 17/003; E21B 43/128
See application file for complete search history.

(56) References Cited

U.S. PATENT DOCUMENTS

| | | | | |
|---|---|---|---|---|
| 4,303,833 A * | 12/1981 | Eckel | ......................... | E03B 3/06 |
| | | | | 290/1 R |
| 4,523,194 A * | 6/1985 | Hyde | .................... | E21B 17/003 |
| | | | | 307/127 |
| 4,547,833 A * | 10/1985 | Sharp | .................... | B60B 33/045 |
| | | | | 174/544 |
| 4,975,979 A * | 12/1990 | Baird | .................... | E21B 17/003 |
| | | | | 212/76 |
| 6,680,606 B1 * | 1/2004 | Ghis | ....................... | G01R 13/34 |
| | | | | 324/76.15 |
| 9,845,643 B2 * | 12/2017 | Brown | .................... | E21B 10/55 |
| 2006/0151211 A1 * | 7/2006 | Coenen | ...................... | E21B 4/04 |
| | | | | 175/19 |
| 2008/0264651 A1 * | 10/2008 | Ali | ....................... | E21B 17/1035 |
| | | | | 166/385 |
| 2012/0093193 A1 * | 4/2012 | Desroques | ............ | E21B 47/011 |
| | | | | 374/136 |
| 2012/0143521 A1 | 6/2012 | Chen | | |
| 2012/0263243 A1 * | 10/2012 | Fallet | ...................... | E21B 47/12 |
| | | | | 375/258 |
| 2017/0092406 A1 * | 3/2017 | Chu | ......................... | H01F 7/064 |
| 2017/0104329 A1 * | 4/2017 | Boe | ........................... | H02J 3/00 |
| 2017/0260851 A1 * | 9/2017 | Rendusara | .............. | E21B 47/12 |

* cited by examiner

*Primary Examiner* — Brad Harcourt
*Assistant Examiner* — Steven A MacDonald
(74) *Attorney, Agent, or Firm* — GE Global Patent Operation; Pabitra Chakrabarti

(57) ABSTRACT

A switch assembly includes one or more solid state semiconductor switches configured to be disposed within a downhole pipe assembly. The one or more switches are configured to operate in a closed state to conduct electric current supplied by a power source disposed above a surface to pumps disposed beneath the surface to cause the pumps to extract a resource from beneath the surface via the pipe assembly. The one or more switches also are configured to operate in an open state to stop conducting the electric current from the power source to the pumps.

22 Claims, 17 Drawing Sheets

DOWNHOLE SWITCH ASSEMBLIES AND METHODS

BACKGROUND

Downhole pumps are used to pump material such as oil and gas from beneath the surface of the earth. These pumps may be connected with downhole tubing that can extend far beneath the surface in order to extract the oil or gas. The pumps may be electrically controllable submersible pumps that are controlled and powered by an electric power supply disposed above the surface.

The power supply can control operation of the pumps by changing when the current is supplied to the pumps. Because the pumps may need to be operated according to a work cycle that includes some down time for the pumps, the power supply may periodically shut off power to one of the pumps while continuing to operate another pump.

Currently, the power supply is connected to the different pumps using separate cables. For each pump, a different cable extends from the power supply to the pump. In some instances, different cables extend from the power supply to each of the pumps, with different cables conducting different phases of a three-phase current to each of the pumps. In order to control (e.g., start or stop) conduction of current or a phase of current to a pump, the power supply starts or stops conducting the current along the respective cable.

Using many separate cables to power and control the pumps can add significant cost to pumping operations. In some instances, the cost of extending cables into the downhole tubing can be in excess of 40% of the total capital cost of the pumping operation. While some proposals for using mechanical switches and fewer cables to control the conduction of current have been made, these proposals are unlikely to operate in the extreme conditions associated with the pumping operations, where temperatures can exceed 200 degrees Celsius and/or pressures in excess of 20,000 pounds per square inch (e.g., 138,000 kilopascals). These conditions can limit the available mechanical switching solutions for controlling when different phases of current are supplied to the pumps to control the pumps.

BRIEF DESCRIPTION

In one embodiment, a switch assembly includes one or more solid state semiconductor switches configured to be disposed within a downhole pipe assembly. The one or more switches are configured to operate in a closed state to conduct electric current supplied by a power source disposed above a surface to pumps disposed beneath the surface to cause the pumps to extract a resource from beneath the surface via the pipe assembly. The one or more switches also are configured to operate in an open state to stop conducting the electric current from the power source to the pumps.

In another embodiment, a system includes plural switch assemblies configured to be disposed within a downhole pipe assembly. The switch assemblies include solid state semiconductor switches disposed on plural substrates and are configured to operate in a closed state to conduct electric current supplied by a power source disposed above a surface to pumps disposed beneath the surface to cause the pumps to extract a resource from beneath the surface via the pipe assembly. The one or more switches configured to operate in an open state to stop conducting the electric current from the power source to the pumps.

In another embodiment, another system includes plural switch assemblies configured to be disposed within a downhole pipe assembly having a passageway through which a resource is pumped from beneath a surface. The switch assemblies include solid state semiconductor switches that are configured to operate in a closed state to conduct electric current supplied by a power source disposed above the surface to pumps disposed beneath the surface to cause the pumps to extract the resource from beneath the surface via the passageway. The one or more switches are configured to operate in an open state to stop conducting the electric current from the power source to the pumps. The switch assemblies are connected with an inner wall of the pipe assembly by heat sinks to transfer heat from the switches to the passageway of the pipe assembly.

DETAILED DESCRIPTION

The following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
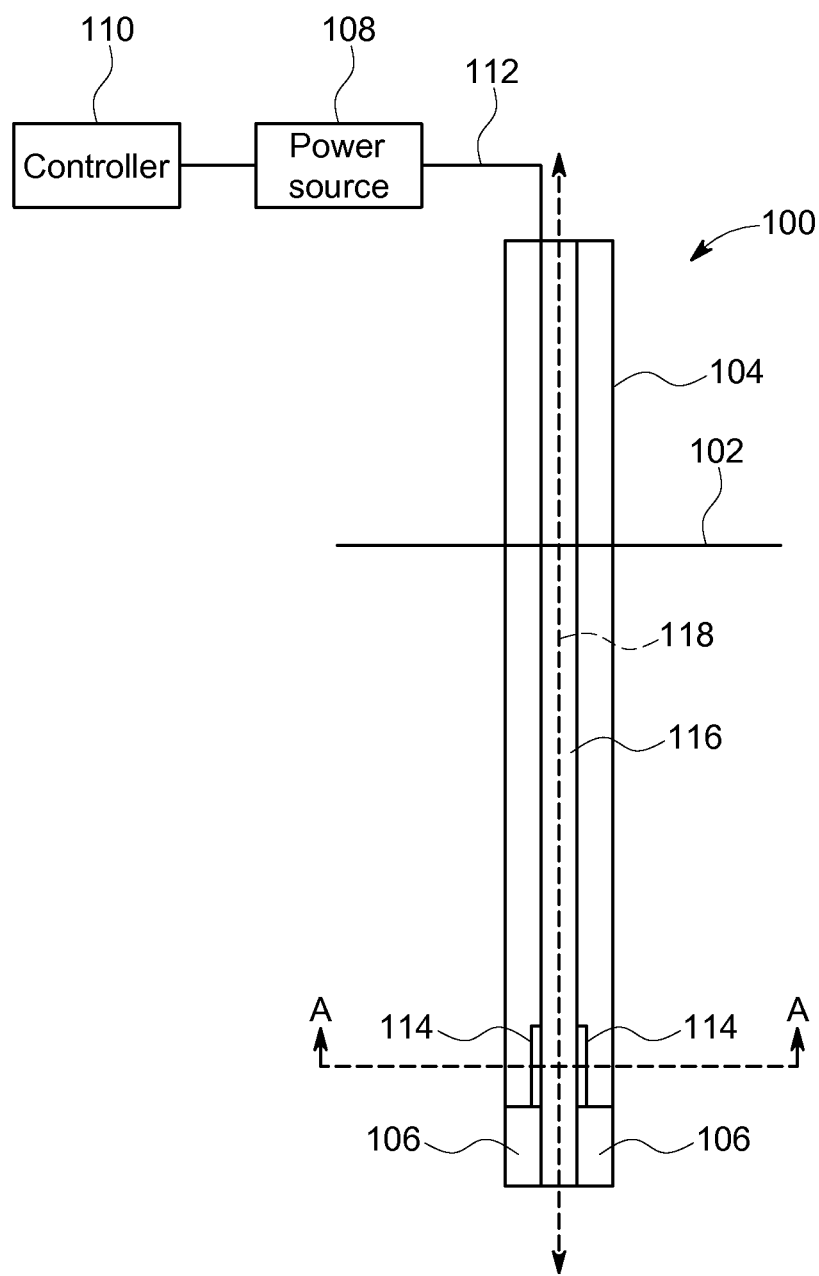
FIG. 1 is a schematic illustration of a downhole system according to one embodiment.

FIG. 1 is a schematic illustration of a downhole system 100 according to one embodiment. The downhole system 100 can be used to extract resources from beneath a surface 102. For example, the downhole system 100 can be used to pump oil, gas, or other resources from beneath the surface 102 of the earth. The downhole system 100 includes a downhole pipe assembly 104 through which the extracted resources are pumped by plural pumps 106. The pipe assembly 104 includes a pipe 116 that is elongated and extends around a center axis 118. The resources being pumped by the pumps 106 are moved through a passageway defined by and bordered by the pipe 116 to above the surface 102. The pipe assembly 104 may extend far beneath the surface 102 into a well, such as several thousand feet or meters beneath the surface of the earth into an oil well.

The pumps 106 are powered by a power source 108 disposed on or above the surface 102. A controller 110 controls operation of the power source 108 and/or pumps 106, and can represent hardware circuitry that includes and/or is connected with one or more processors (e.g., a computer having an operator interface, one or more microprocessors, etc.). Conductive pathways 112, such as wires or cables, extend from the power source 108 and through the assembly 104 to the pumps 106. A transfer switch assembly 114 controls conduction of electric current from the power source 108 to the pumps 106. The transfer switch assembly 114 is disposed inside one or more pipes that form the pipe assembly 104. The transfer switch assembly 114 includes solid state switching devices that alternate between an active (e.g., closed) state to conduct current from the power source 108 to the pumps 106 and a deactivated (e.g., open) state to stop conducting current from the power source 108 to the pumps 106. Different switching devices can control conduction of different phases of current to different pumps 106.

In one aspect, the transfer switch assembly 114 provides bi-directional conduction of current between the power source 108 and the pumps 106 and/or provides bi-directional voltage blocking. The bi-directional conduction of current allows for current to be conducted from the power source 108 to the pumps 106 via the switches in the switch assembly 114, and also for current to be conducted from one or more of the pumps 106 to the power source 108 via the switches in the switch assembly 114. The bi-directional voltage blocking capability of the transfer switch assembly 114 can allow for the semiconductor switches in the assembly 114 to block the conduction of voltage in either direction (e.g., from the power source 108 to the pumps 106 and from the pumps 106 to the power source 108). For example, the switches can have an on state and an off state for both positive and negative voltages applied to anodes of the switches.

Figure 2:
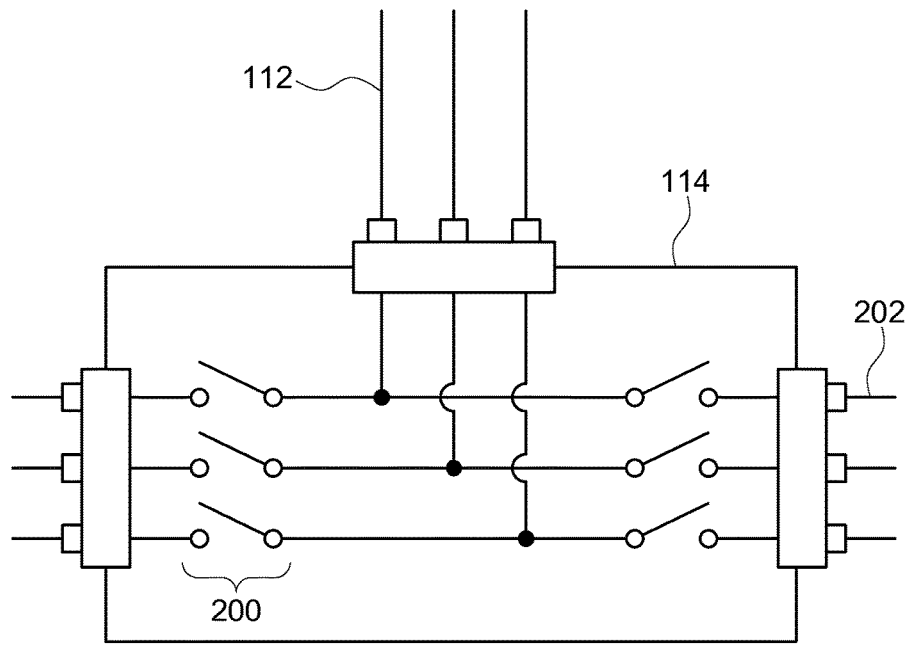
FIG. 2 is a schematic illustration of one embodiment of the switch assembly shown in FIG. 1.

FIG. 2 is a schematic illustration of one embodiment of the switch assembly 114 shown in FIG. 1. The switch assembly 114 can receive different phases of current from the power source 108 (shown in FIG. 1) via different conductive pathways 112. The switch assembly 114 includes several switching devices 200 that connect the conductive pathways 112 with different conductive pathways 202. The switching devices 200 are illustrated as mechanical switches, but can represent solid state switches, such as metal-oxide-semiconductor field effect transistors (MOSFETs), thyristors, junction field effect transistors (JFETs), or another type of solid state device. In one aspect, the switching devices 200 may be solid state semiconductor switches formed from or including silicon carbide (SiC). Alternatively, another material may be used.

Different switching devices 200 connect different pairs of pathways 112, 202 in the illustrated embodiment. A switching device 200 can activate to conduct a phase of a current from the power source 108 to a pump 106, and can deactivate to stop conducting the phase of the current from the power source 108 to the pump 106. By controlling which switching devices 200 are closed at different times, the switch assembly 114 can control which pumps 106 are operating. The switching devices 200 are connected to the same conductive pathways 112 that provide the different phases of the current from the power source 108, but can separately conduct the different phases to the pumps 106 to individually control the pumps 106. For example, one pump 106 may be powered by three phases of the current while another pump 106 is deactivated, both pumps 106 may be powered by the three phases of current at the same time, and/or both pumps 106 may be deactivated.

Figure 3:
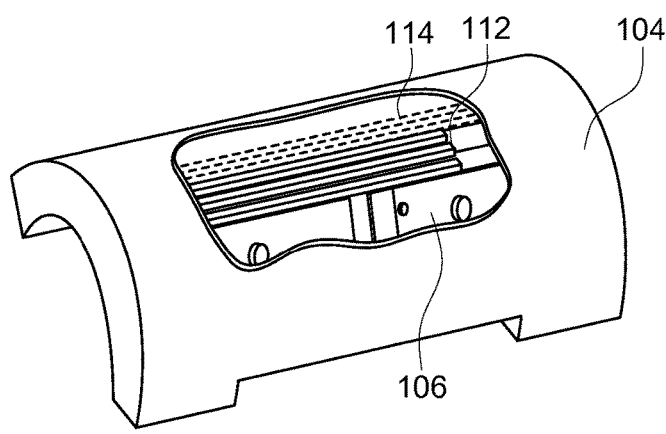
FIG. 3 illustrates a segment of a pipe assembly shown in FIG. 1.

FIG. 3 illustrates a segment of the pipe assembly 104 shown in FIG. 1. The segment shown in FIG. 3 has a portion removed so that some components of the pipe assembly 104 are visible. For example, a switch assembly 114, pump 106, and parts of the conductive pathways 112 are visible in FIG. 3.

Figure 4:
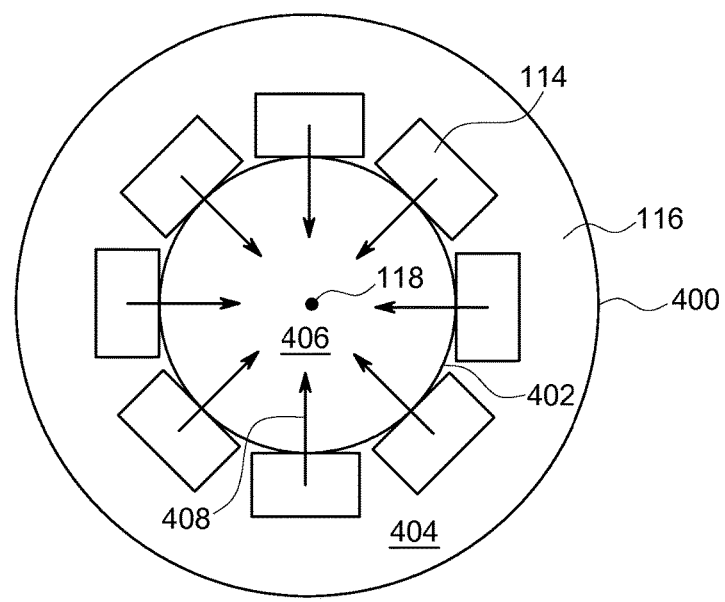
FIG. 4 illustrates a cross-sectional view of the pipe assembly along line A-A shown in FIG. 1.

FIG. 4 illustrates a cross-sectional view of the pipe assembly 104 along line A-A shown in FIG. 1. The pipe assembly 104 includes an outer wall 400 and an inner wall 402 that define an interior chamber 404 between the walls 400, 402. The inner wall 402 extends around and defines a pumping passageway 406. The resources that are extracted from beneath the surface 102 (shown in FIG. 1) are pumped by the pumps 106 through the passageway 406 to a location above the surface 102.

Several switch assemblies 114 may be mounted to the inner wall 402 of the pipe assembly 104. The switch assemblies 114 may be connected to the inner wall 402 in order to transfer thermal energy, or heat, from the switch assemblies 114 to the resources being pumped through the passageway 406. The ambient temperature around the pipe assembly 104 may be elevated, such as up to temperatures in excess of 150 degrees Celsius. In order to prevent the switch assemblies 114 from being damaged or failing due to the elevated temperatures, the switch assemblies 114 are mounted to the inner wall 402 such that heat 408 is transferred from the switch assemblies 114, through the inner wall 402, and to the resources being pumped through the passageway 406. This transfer of heat 408 can maintain the switch assemblies 114 at lower temperatures that allow the switch assemblies 114 to continue functioning.

Figure 5:
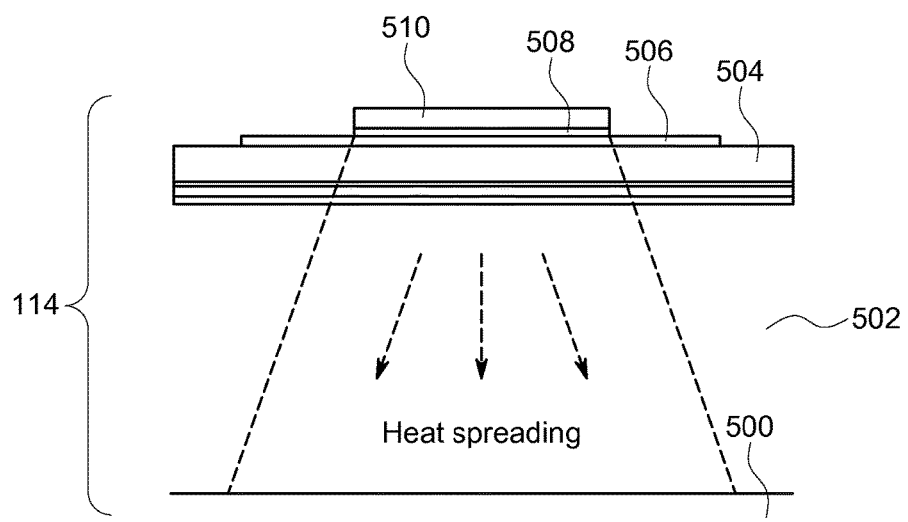
FIG. 5 illustrates a side view of one of the switch assemblies shown in FIGS. 1 and 4 according to one embodiment.

FIG. 5 illustrates a side view of one of the switch assemblies 114 shown in FIGS. 1 and 4 according to one embodiment. The switch assembly 114 shown in FIG. 5 includes a heat sink 500 that is formed from a heat conductive material, such as copper, copper alloy, or another material. The heat sink 500 is coupled with a baseplate 502, which may be formed from the same material as the heat sink 500, or may be made from another material. A circuit substrate 504 is connected with the baseplate 502. The substrate 504 may be formed from a ceramic material, such as direct bonded copper (DBC) or direct copper bonded (DCB). In one embodiment, the substrate 504 is formed as a ceramic foil. A ceramic layer 506 is connected with the substrate 504, such as a layer formed from DBC copper. A conductive layer 508 is connected with the ceramic layer 506, such as a layer formed from gold and germanium (e.g., Au88-GE12). One or more solid state semiconductor switches 510 are connected with the layer 508. For example, the switches 510 may include MOSFETs formed from SiC. While only one switch 510 is shown in FIG. 5, alternatively, the switch assembly 114 may include several switches 510. Thermal energy, or heat 408, is transferred from the switch 510, through the layers 506, 508, the substrate 504, and the baseplate 502 to the heat sink 500. The heat 408 is then transferred out of the switch assembly 114 through the inner wall 402 (shown in FIG. 4) of the pipe assembly 104 (shown in FIGS. 1 and 4).

Figure 6:
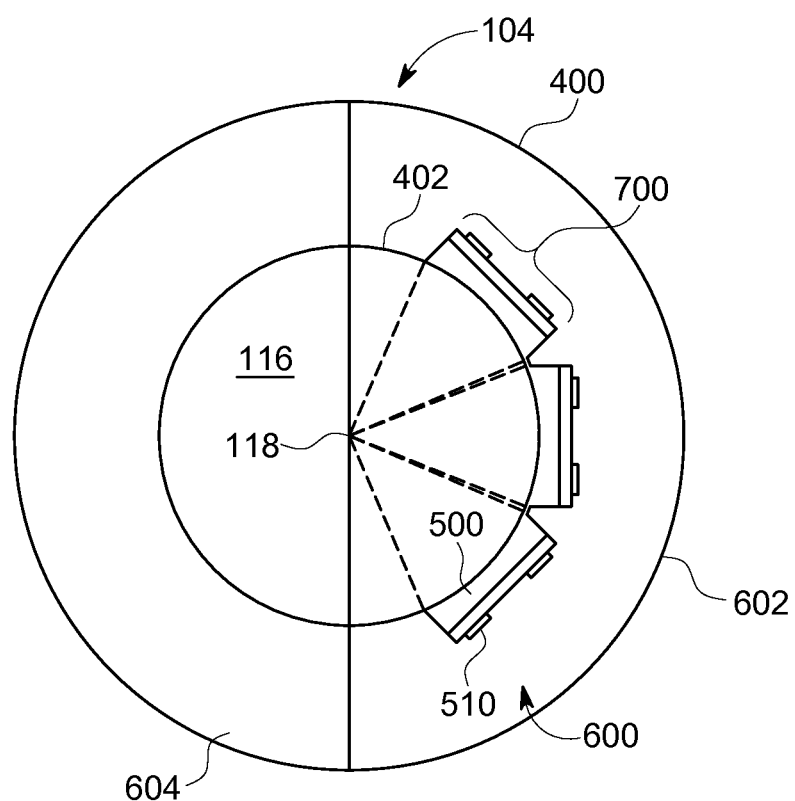
FIG. 6 illustrates a cross-sectional view of one embodiment of the pipe assembly along line A-A shown in FIG. 1.
Figure 7:
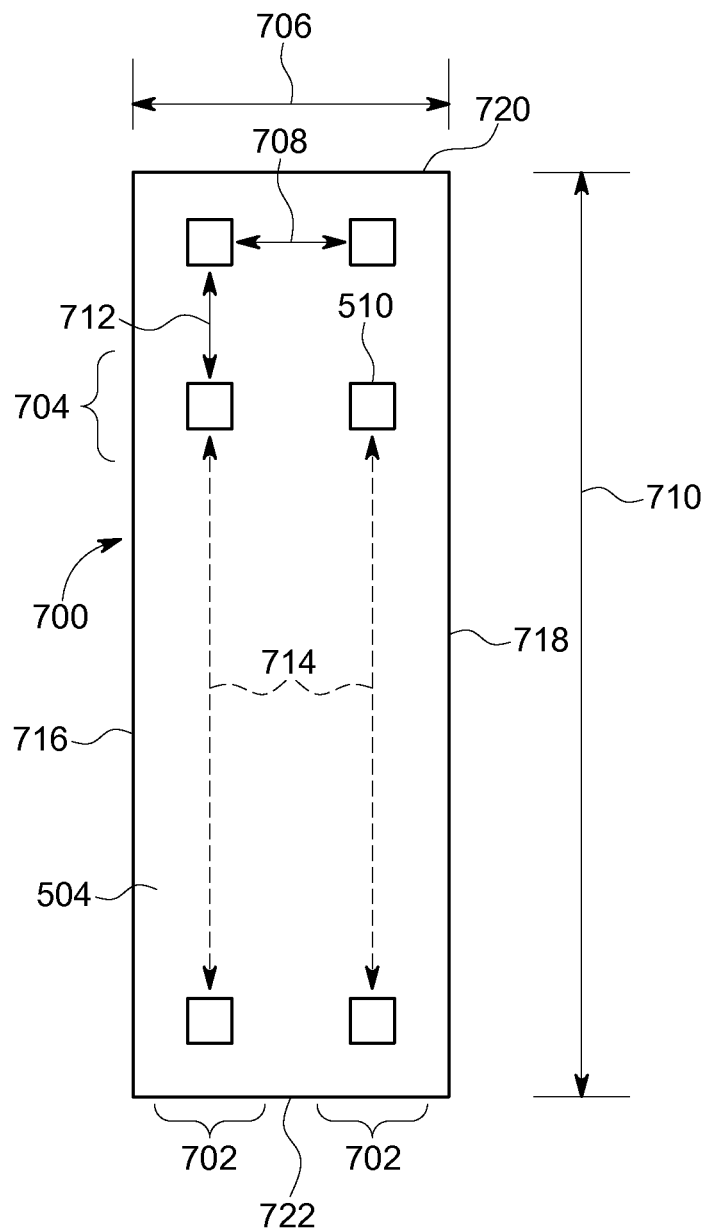
FIG. 7 illustrates a plan view of a switch assembly according to one embodiment.

FIG. 6 illustrates a cross-sectional view of one embodiment of the pipe assembly 104 along line A-A shown in FIG. 1. FIG. 7 illustrates a plan view of a switch assembly 700 according to one embodiment. The switch assembly 700 can represent the switch assembly 114 shown and described herein. The pipe assembly 104 can include a housing 600 (FIG. 6) that holds several switch assemblies 114. In the illustrated embodiment, the housing 600 is formed into two half bodies 602, 604 (FIG. 6) joined together to extend around the passageway 406. Alternatively, the housing 600 may be formed from a larger number of bodies than two, or may be a single body. The housing 600 may not extend the entire length of the pipe assembly 104. For example, the housing 600 may be connected with the remainder of the pipe assembly 104 at or near a distal end of the pipe assembly 104.

The housing 600 includes the outer and inner walls 400, 402 described above in connection with FIG. 4. In the illustrated embodiment, the switch assemblies 700 are disposed in only one of the bodies 602, 604 of the housing 600. Alternatively, at least one switch assembly 700 may be disposed in each of the bodies 602, 604. The switch assemblies 700 are mounted to the inner wall 402 of the housing 600 such that the heat sinks 500 of the switch assemblies 700 are coupled with the inner wall 402. The heat sinks 500 may be directly coupled with the inner wall 402 of the housing 600 such that the heat sinks 500 are in direct contact with the inner wall 402 and the heat sinks 500 abut the inner wall 402 of the housing 600.

As shown in FIG. 7, the switch assemblies 700 can include several switches 510 on a common substrate 504. For example, several switches 510 can be mounted on the same substrate 504. The switches 510 are arranged in two columns 702 and several rows 704 in order to keep the switches 510 far enough from each other to allow heat 408 (shown in FIG. 4) generated by the switches 510 to dissipate. For example, the switches 510 can be arranged in the columns 702 and rows 704 so that the thermal energy generated by one switch 510 does not heat another switch 510. The switches 510 are arranged in the columns 702 such that the switches 510 are linearly aligned with each other along directions 714 that are parallel to each other and to the center axis 118 (FIG. 6) of the pipe assembly 104 (the center axis 118 also may be the center axis of the housing 600).

The substrate 504 may be a planar body having dimensions that are larger in two directions (e.g., directions parallel to the plane of FIG. 7) than in a third direction (e.g., a direction that is perpendicular to the plane of FIG. 7). The substrate 504 is elongated such that a length dimension 710 of the substrate 504 is larger than a width dimension 706 of the substrate 504. The length dimension 710 can be measured from one end 720 of the substrate 504 to an opposite end 722. The width dimension 706 can be measured from one side 716 of the substrate 504 to an opposite side 718 of the substrate 504. Alternatively, the substrate 504 may have another shape.

Three switch assemblies 700 are shown in FIG. 6. Each of the three switch assemblies 700 may be used to control conduction of a different phase of the current supplied from the power source 108 (shown in FIG. 1). For example, a first switch assembly 700 may include switches 510 that open or close to stop conduction or conduct, respectively, a first phase of an alternating current provided by the power source 108, a different, second switch assembly 700 may include switches 510 that open or close to stop conduction or conduct, respectively, a different, second phase of the alternating current provided by the power source 108, and a different, third switch assembly 700 may include switches 510 that open or close to stop conduction or conduct, respectively, a different, third phase of the alternating current provided by the power source 108. Alternatively, one or more switch assemblies 700 may include switches 510 that control conduction of more than one phase of the current and/or a different number of the switch assemblies 700 may be provided in the housing 600.

In the switch assembly 700, the switches 510 are arranged in the columns 702 and rows 704 in a regular grid. For example, except for the switches 510 in the top and bottom rows 704, the switches 510 have other switches 510 directly above and/or below, and have other switches 510 directly to the left (or right). The switches 510 in the left column 702 may all be the same distance from one side edge 716, the switches 510 in the right column 702 may all be the same distance from the opposite side edge 718, the switches 510 in the top row 704 may all be the same distance from the top edge 720, and/or the switches 510 in the bottom row 704 may all be the same distance from the opposite bottom edge 722.

In order to fit the switch assemblies 700 in the housing 600, the width dimension 706 of the switch assemblies 700 may be restricted. The width dimension 706 can be large enough to keep a horizontal separation distance 708 between the switches 510 large enough to prevent the switches 510 from heating each other up, while also leaving enough room to fit a sufficient number of switches 510 to control conduction of the current. The length dimension 710 of the switch assemblies 700 may be sufficiently long to fit the sufficient number of switches 510 to control conduction of the current, while keeping a vertical separation distance 712 between the switches 510 large enough to prevent the switches 510 from heating each other up.

Figure 8:
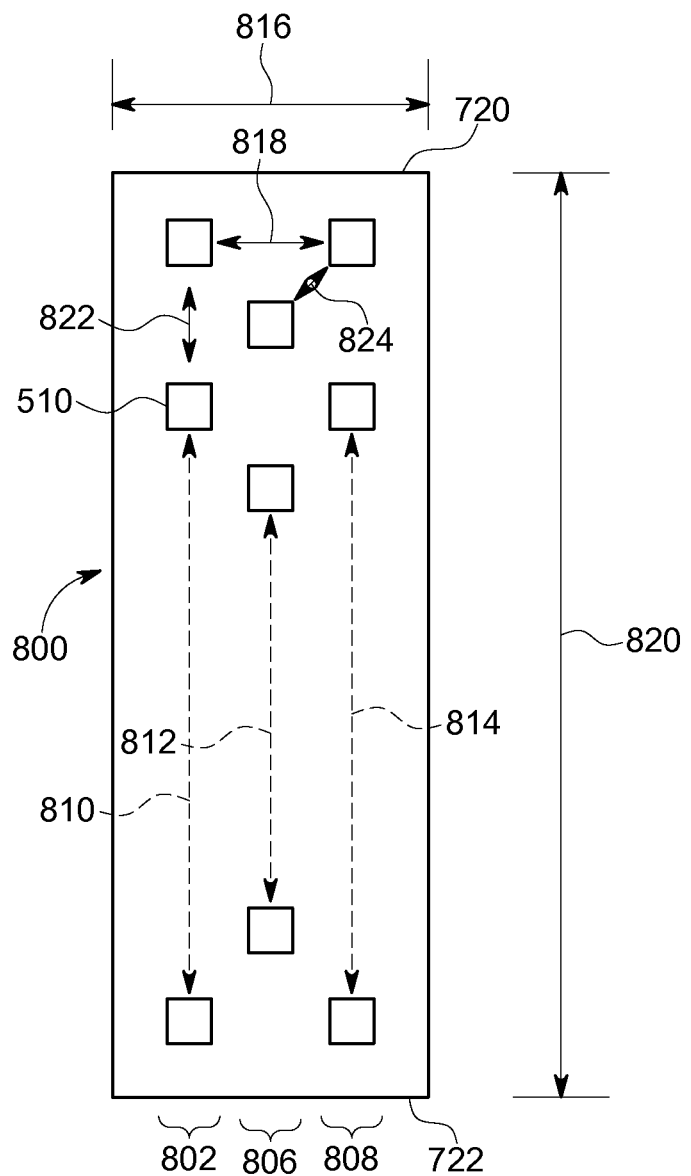
FIG. 8 illustrates a plan view of a switch assembly according to one embodiment.

FIG. 8 illustrates a plan view of a switch assembly 800 according to one embodiment. The switch assembly 800 can represent the switch assembly 114 shown and described herein. Similar to the switch assemblies 700 shown in FIG. 7, the switch assembly 800 can include several switches 510 on the same substrate 504. The housing 600 may include three switch assemblies 800, a different number of the switch assemblies 800, or a single switch assembly 800. In contrast to the switch assembly 700 shown in FIG. 7, the switches 510 in the switch assembly 800 are not arranged in a regular grid. For example, the switches 510 may be arranged in three columns 802, 806, 808 and several rows 804 in order to keep the switches 510 far enough from each other to allow heat 408 (shown in FIG. 4) generated by the switches 510 to dissipate, while reducing one or more dimensions of the substrate 504 relative to the switch assembly 800.

In the switch assembly 800, one column 806 (e.g., the middle column 806) of the switches 510 is vertically offset from the other columns 802, 808. For example, the top and bottom switches 510 in the middle column 806 may not be as close to the top or bottom edges 720, 722 of the substrate 504 as the top and bottom switches 510 in the columns 802, 808. The switches 510 in each column are linearly aligned with each other along directions 810, 812, 814 that are parallel to each other and to the center axis 118 (FIG. 6) of the pipe assembly 104.

In order to fit the switch assemblies 800 in the housing 600, a width dimension 816 of the switch assemblies 800 may be restricted. The width dimension 816 can be large enough to keep a horizontal separation distance 818 between the switches 510 that are to the left or right of each other large enough to prevent the switches 510 from heating each other up, while also leaving enough room to fit a sufficient number of switches 510 to control conduction of the current. A length dimension 820 of the switch assembly 800 may be sufficiently long to fit the sufficient number of switches 510 to control conduction of the current, while keeping a vertical separation distance 822 between the switches 510 in the same column 802, 806, 808 large enough to prevent the switches 510 from heating each other up. The width and length dimensions 816, 820 can be large enough to keep an angled separation distance 824 between the switches 510 in the middle column 806 and the closest switches 510 in the other columns 802, 808 large enough to prevent the switches 510 from heating each other up.

Due to the third column 806 of switches 510 in the switch assembly 800, the width dimension 816 of the switch assembly 800 may be larger than the width dimension 706 of the switch assembly 700 shown in FIG. 7 (with both switch assemblies 700, 800 having the same number of switches 510). But, the third column 806 of the switches 510 in the switch assembly 800 can reduce the length dimension 820 of the switch assembly 800 relative to the length dimension 710 of the switch assembly 700. As a result, the switch assemblies 800 in the pipe assembly 104 may extend along a shorter portion of the length of the pipe assembly 104 than the switch assemblies 700.

Figure 9:
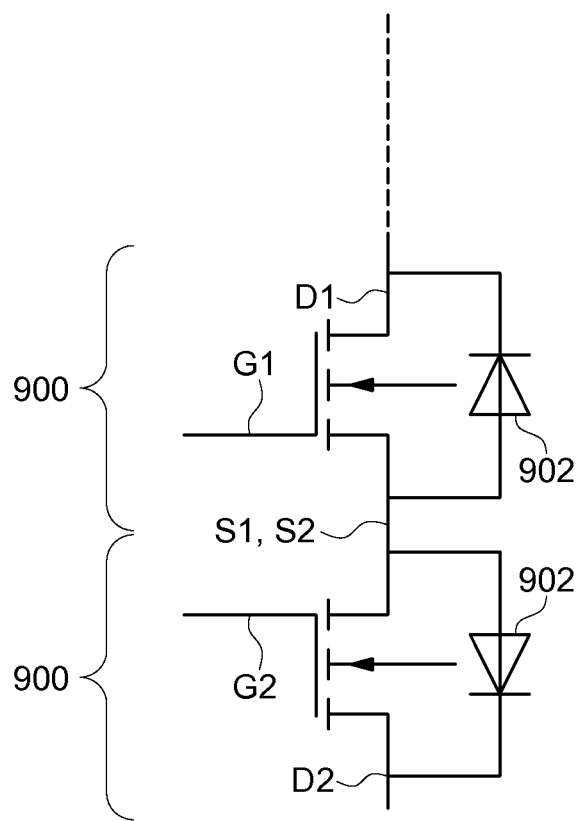
FIG. 9 illustrates a circuit diagram of switches according to one embodiment.

FIG. 9 illustrates a circuit diagram of switches 900 according to one embodiment. The switches 900 can represent the switches 510 shown in FIGS. 5 through 8. The switches 900 are illustrated as MOSFETs having gates (G1 and G2 in FIG. 9), sources (S1 and S2 in FIG. 9), and drains (D1 and D2 in FIG. 9). The sources S1, S2 of the switches 900 may be connected to form a common source for the switches 900. The switches 900 can include diodes 902 having anodes connected with the sources S1, S2 and cathodes connected with the drains D1, D2.

Figure 10:
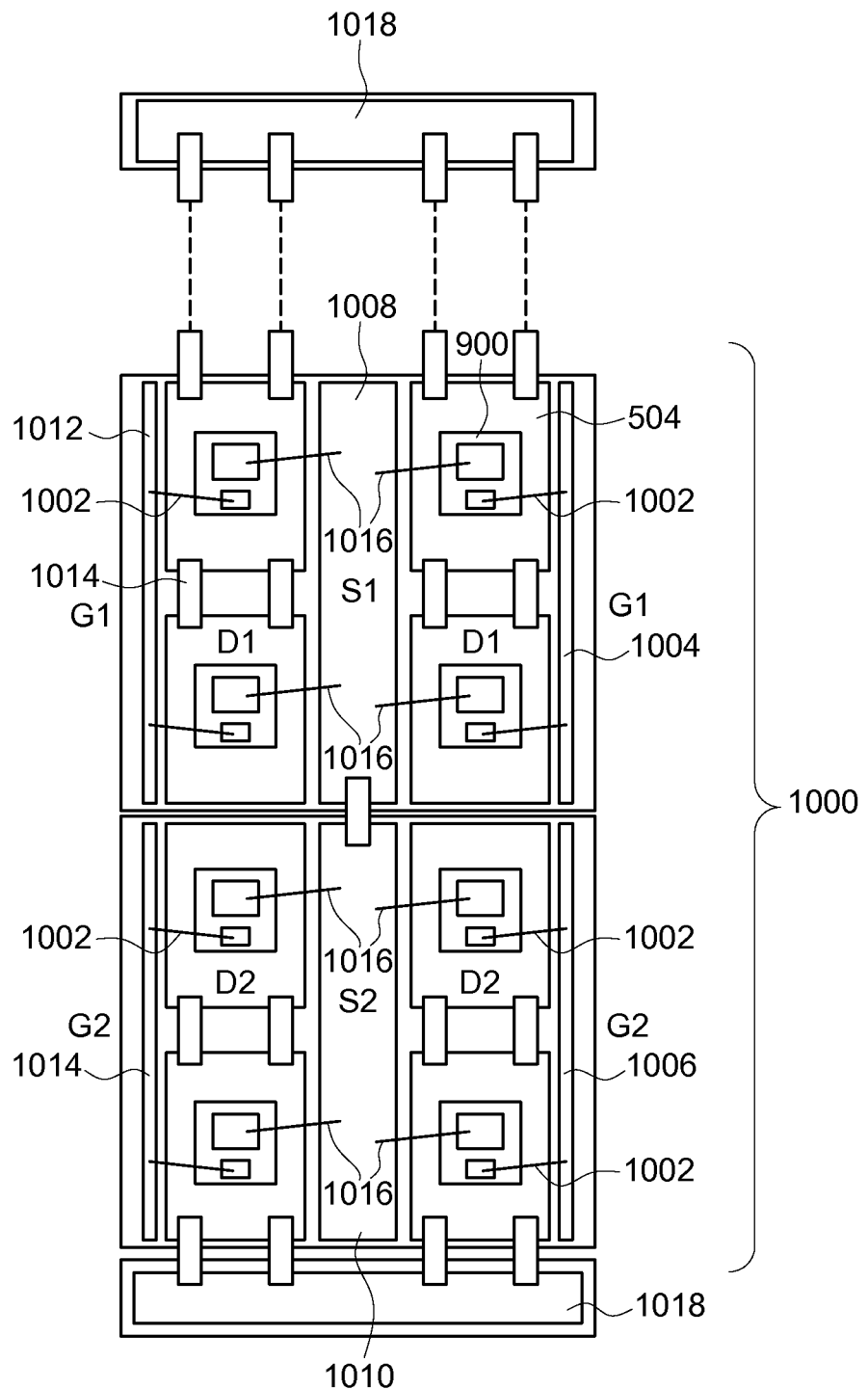
FIG. 10 illustrates a plan view of a switch assembly according to one embodiment.

FIG. 10 illustrates a plan view of a switch assembly 1000 according to one embodiment. The switch assembly 1000 can represent the switch assembly 114 shown and described herein. Similar to the switch assemblies 700, 800 shown in FIGS. 7 and 8, the switch assembly 1000 can include several switches 900. In contrast to the switch assemblies 700, 800, the switches 900 are not mounted on the same substrate 504. The switches 900 are mounted to separate circuit substrates 504, which are conductively coupled with conductive pathways 1002, 1004, 1006, 1008, 1010, 1012, 1014, 1016. The conductive pathways 1002, 1004, 1006, 1008, 1010, 1012, 1014, 1016 can represent wire bonds and/or copper foils. Alternatively, another type of conductive pathway can be used.

The conductive pathways can be connected with each other and the switches 900 to connect the gates, sources, and drains as shown in FIG. 9. For example, the conductive pathways 1002 can couple the gates G1, G2 of the switches 900 with the conductive pathways 1004, 1006, 1012. The conductive pathways 1008, 1010, 1016 can connect the sources S1, S2 of the switches 900 with each other. The conductive pathways 1014, 1018 can connect the drains D1, D2 of the switches 900 with the power source 108 and/or the pumps 106 shown in FIG. 1.

Figure 11:
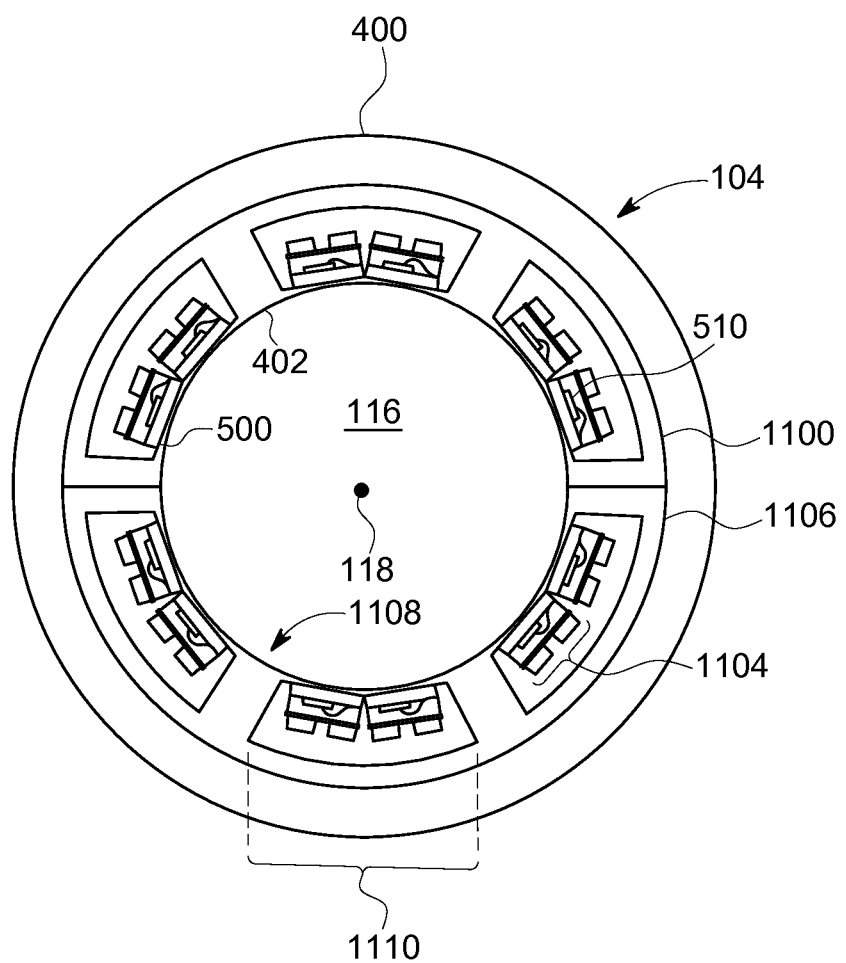
FIG. 11 illustrates a cross-sectional view of another embodiment of the pipe assembly along line A-A shown in FIG. 1.

FIG. 11 illustrates a cross-sectional view of another embodiment of the pipe assembly 104 along line A-A shown in FIG. 1. In the pipe assembly 104 shown in FIG. 11, two housings 1100, 1106 are provided that encircle the center axis 118 and passageway 116 of the pipe assembly 104. For example, each of the housings 1100, 1106 forms one half of a circular shape such that the combination of the housings 1100, 1106 extends around the center axis 118 and passageway 116. Alternatively, the pipe assembly 104 may include a single housing 1100, 1106 or more than two housings 1100, 1106. The housings 1100, 1106 include switch assemblies 1104. The switch assemblies 1104 can represent one or more of the switch assemblies 114, 700, 800, 1000 described herein. The switch assemblies 1104 include several switches 510.

In contrast to the embodiment of the pipe assembly 104 shown in FIG. 6, the switch assemblies 1104 extend around more than half of a circumference 1108 of the pipe assembly 104 or inner wall 402 of the pipe assembly 104. In one embodiment, each housing 1100, 1106 can include groups 1110 of switch assemblies 1104 that separately control conduction of different phases of the current supplied from the power source 108 to different pumps 106 (shown in FIG. 1). For example, the switch assemblies 1104 in a first group 1110 in the housing 1100 may control conduction of current from the power source 108 to one pump 106 while the switch assemblies 1104 in a second group 1110 in the housing 1106 may control conduction of the current from the power source 108 to the other pump 106. In one aspect, the different switch assemblies 1104 in each group 1110 may separately control conduction of different phases of the current to the different pumps 106. For example, a first group 1110 of switch assemblies 1104 in the housing 1100 can control conduction of a first phase of current to a first pump 106, a different, second group 1110 of the switch assemblies 1104 in the housing 1100 can control conduction of a different, second phase of current to the first pump 106, a different, third group 1110 of the switch assemblies 1104 in the housing 1100 can control conduction of a different, third phase of current to the first pump 106, a first group 1110 of the switch assemblies 1104 in the other housing 1106 can control conduction of the first phase of current to a different, second pump 106, a different, second group 1110 of the switch assemblies 1104 in the housing 1106 can control conduction of the second phase of current to the second pump 106, and a different, third group 1110 of the switch assemblies 1104 in the housing 1106 can control conduction of the third phase of current to the second pump 106.

Figure 12:
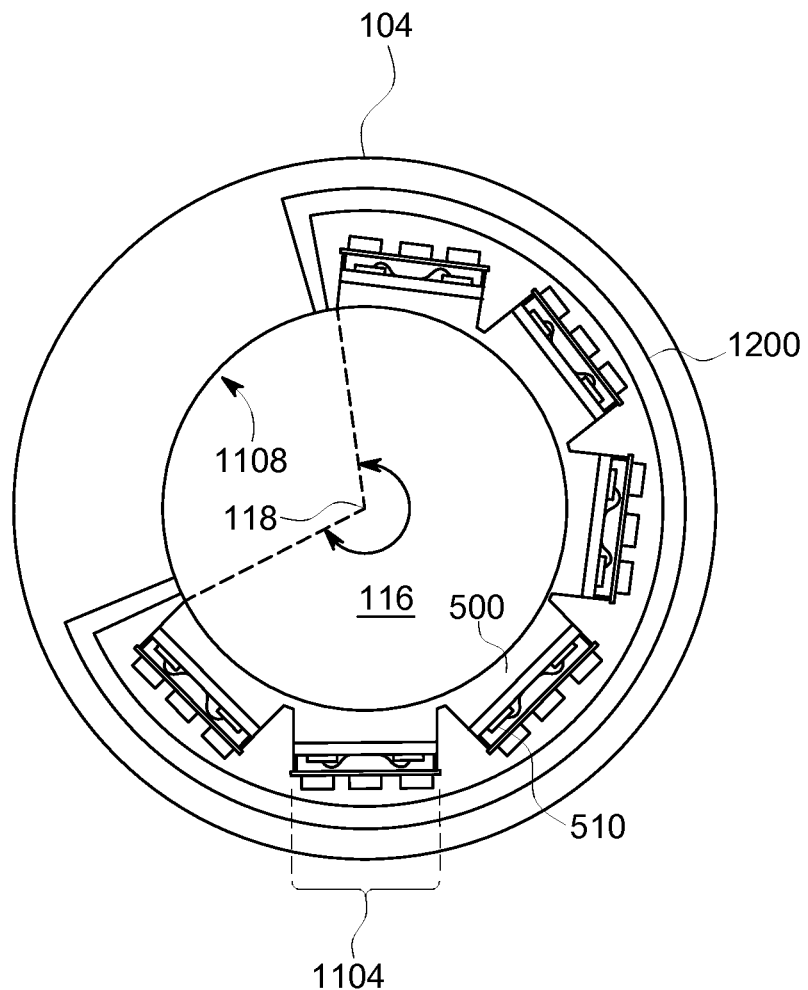
FIG. 12 illustrates a cross-sectional view of another embodiment of the pipe assembly along line A-A shown in FIG. 1.

FIG. 12 illustrates a cross-sectional view of another embodiment of the pipe assembly 104 along line A-A shown in FIG. 1. In the pipe assembly 104 shown in FIG. 12, a single housing 1200 is provided that partially encircles the center axis 118 and passageway 116 of the pipe assembly 104. For example, instead of a single or multiple housings completely extending around and encircling the circumference 1108 of the passageway 116, the housing 1200 extends around less than the entire circumference 1108 of the passageway 116 or inner wall 402. In the illustrated embodiment, the housing 1200 extends 240 degrees around the circumference 1108 of the passageway 116 or inner wall 402.

The housing 1200 includes the switch assemblies 1104 and switches 510 shown in FIG. 11. The switch assemblies 1104 can separately control conduction of different phases of the current supplied from the power source 108 to different pumps 106 (shown in FIG. 1), as described above. For example, a first switch assembly 1104 in the housing 1200 can control conduction of a first phase of current to a first pump 106, a different, second switch assembly 1104 in the housing 1200 can control conduction of a different, second phase of current to the first pump 106, a different, third switch assembly 1104 in the housing 1200 can control conduction of a different, third phase of current to the first pump 106, a fourth switch assembly 1104 in the housing 1200 can control conduction of the first phase of current to a different, second pump 106, a fifth switch assembly 1104 in the housing 1200 can control conduction of the second phase of current to the second pump 106, and a sixth switch assembly 1104 in the housing 1200 can control conduction of the third phase of current to the second pump 106.

Figure 13:
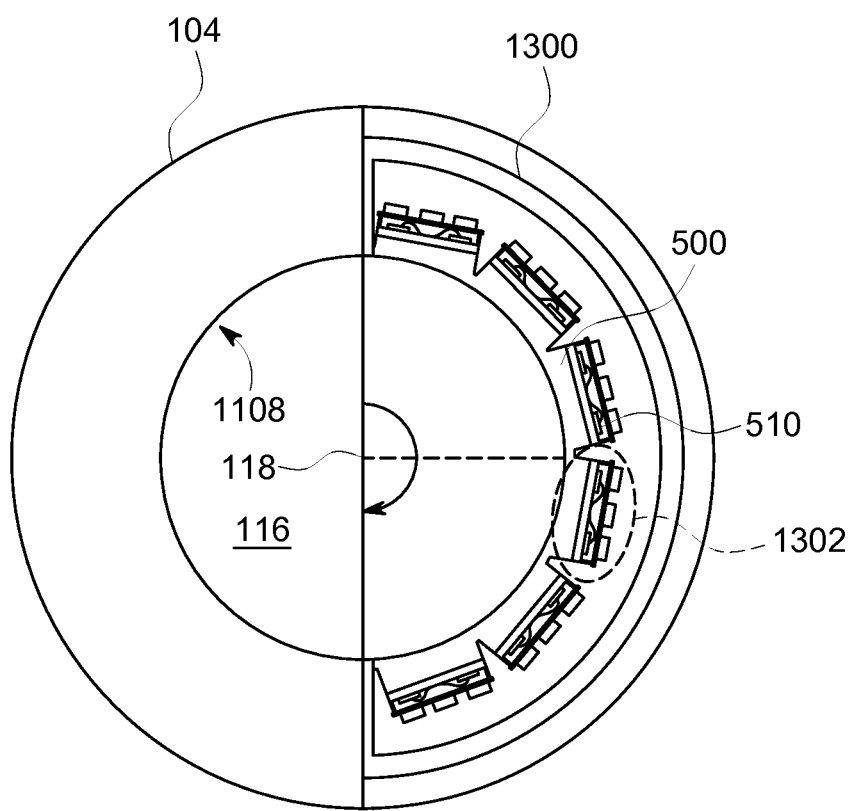
FIG. 13 illustrates a cross-sectional view of another embodiment of the pipe assembly along line A-A shown in FIG. 1.

FIG. 13 illustrates a cross-sectional view of another embodiment of the pipe assembly 104 along line A-A shown in FIG. 1. In the pipe assembly 104 shown in FIG. 13, a single housing 1300 is provided that partially encircles the center axis 118 and passageway 116 of the pipe assembly 104. The housing 1300 shown in FIG. 13 extends around half or less than half of the entire circumference 1108 of the passageway 116 or inner wall 402. In the illustrated embodiment, the housing 1300 extends 180 degrees or less than 180 around the circumference 1108 of the passageway 116 or inner wall 402.

The housing 1300 may be easier to mount to the pipe assembly 104 than other housings. Housings that extend around more than half of the circumference of the inner wall 402 of the pipe assembly 104 may need to be mounted to the pipe assembly 104 by sliding the housings onto the inner wall 402 from one end of the pipe assembly 104 and sliding the housings along the length of the pipe assembly 104 to a final location. In contrast, the housing 1300 may be placed onto the inner wall 402 of the pipe assembly 104 at a desired or final location, without having to slide the housing 1300 along the length of the pipe assembly 104.

Figure 14:
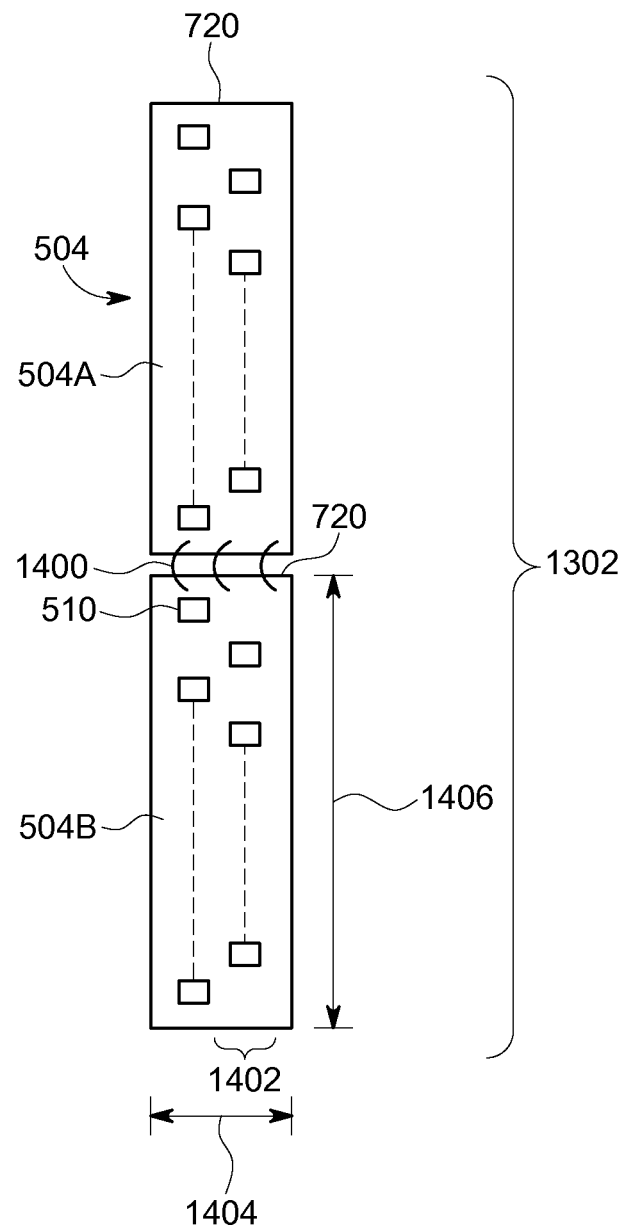
FIG. 14 illustrates a plan view of one of the switch assemblies shown in FIG. 13 according to one embodiment.

With continued reference to the pipe assembly 104 shown in FIG. 13, FIG. 14 illustrates a plan view of one of the switch assemblies 1302 shown in FIG. 13 according to one embodiment. The switch assembly 1302 includes multiple separate substrates 504 (e.g., substrates 504A, 504B) with the switches 510 disposed thereon. The substrates 504 are conductively coupled by one or more conductive pathways 1400, such as wire bonds, foils, or the like. While two substrates 504 are shown in FIG. 14, the switch assembly 1302 may include more than two substrates 504 conductively coupled with each other. The switches 510 on the substrates 504 are arranged into two columns 1402. One column 1402 of the switches 510 is disposed closer to upper ends 720 of the substrates 504 such that the switches 510 in one column 1402 are not arranged in rows with the switches 510 in the other column 1402. For example, the switches 510 in one column 1402 are vertically offset relative to the switches 510 in the other column 1402. Alternatively, the substrates 504 may include more than two columns 1402 of the switches 510 and/or the switches 510 in different columns 1402 may be arranged in rows.

The substrates 504 may have a smaller width dimension 1404 and/or a larger length dimension 1406 than the width dimensions and length dimensions of the substrates 504 included in other switch assemblies described herein. The dimensions 1404, 1406 of the substrates 504 in the switch assembly 1302 may be different than those of the substrates 504 in the other switch assemblies in order to fit a sufficient number of the switch assemblies 1302 within half or less than half of the circumference 1108 of the inner wall 402 of the pipe assembly 104. For example, two switch assemblies 1302 may control one phase of electric current provided by the power source 108, with six switch assemblies 1302 included in the housing 1300 shown in FIG. 13. Alternatively, another number of switch assemblies 1302 may be provided. In order to fit these switch assemblies 1302 within the housing 1300 such that the housing 1300 does not extend across more than half of the circumference 1108 of the inner wall 402, the substrates 504 in the switch assemblies 1302 may be narrower than the substrates 504 in the other switch assemblies. In order to keep the switches 510 on the substrates 504 of the switch assemblies 1302 from heating each other, the length dimension of the substrates 504 in the switch assemblies 1302 may be longer than the substrates 504 in the other switch assemblies so that the switches 510 can be farther from each other.

Figure 15:
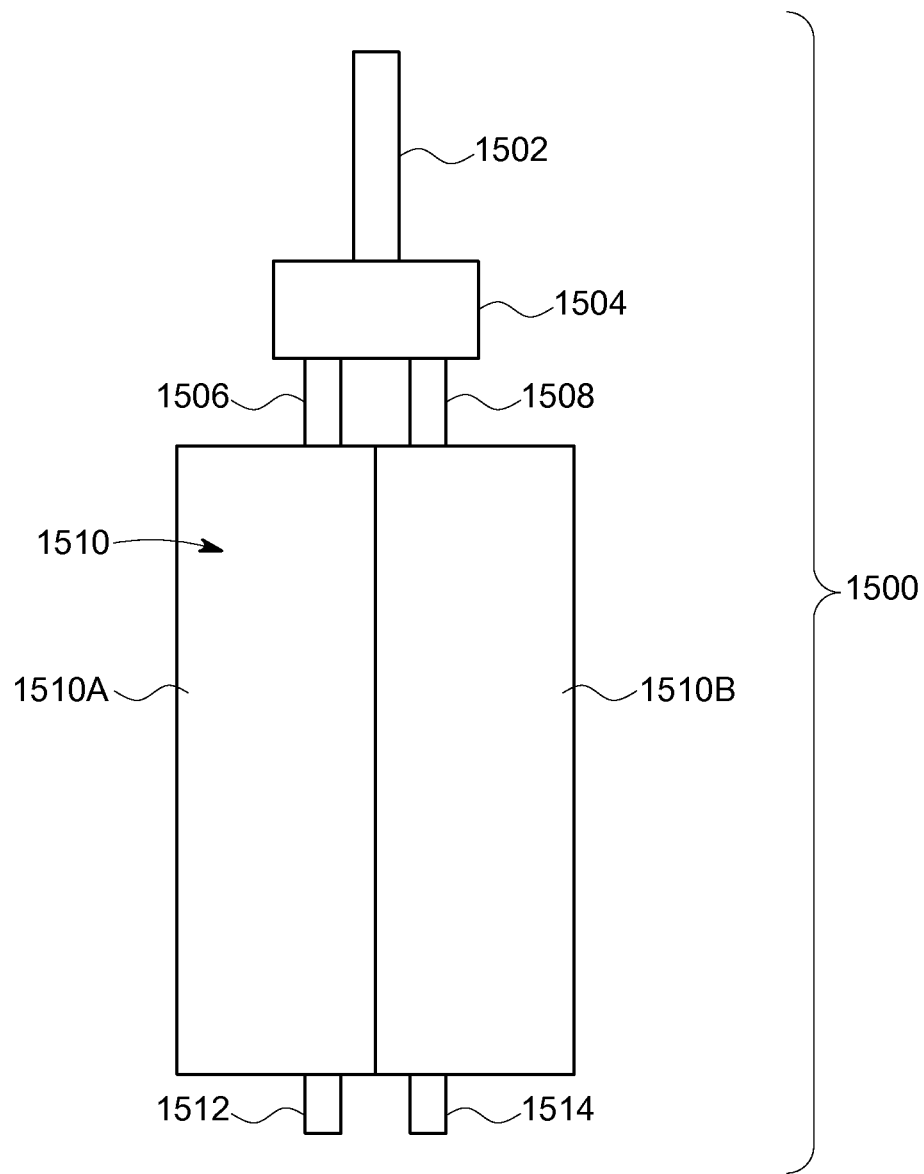
FIG. 15 illustrates a power supply connection assembly according to one embodiment.

FIG. 15 illustrates a power supply connection assembly 1500 according to one embodiment. The connection assembly 1500 may conductively couple the power source 108 (shown in FIG. 1) with switch assemblies 1510 (e.g., switch assemblies 1510A, 1510B) and may conductively couple the switch assemblies 1510 with the pumps 106 (shown in FIG. 1). The connection assembly 1500 may be operatively coupled with the pipe assembly 104. For example, the connection assembly 1500 may be connected with the pipe assembly 104 such that the connection assembly 1500 is in the interior chamber 404 (shown in FIG. 4) of the pipe assembly 104.

The connection assembly 1500 includes a splitting device 1504 that is conductively coupled with a conductive pathway 1502. The conductive pathway 1502 can represent one of the conductive pathways 112 shown in FIG. 1. For example, the conductive pathway 1502 can represent a cable that conducts multi-phase electric current from the power source 108 to the pipe assembly 104. The splitting device 1504 includes a splitter that conductively couples the conductive pathway 1502 with plural different conductive pathways 1506, 1508. The conductive pathways 1506, 1508 can represent separate cables, wires, busses, or other conductive bodies. The splitting device 1504 can couple the pathways 1502, 1506, 1508 such that the same current conducted in the pathway 1502 also is conducted by the pathways 1506, 1508.

The conductive pathways 1506, 1508 are connected with different switch assemblies 1510 (e.g., switch assemblies 1510A, 1510B). The switch assemblies 1510 can represent one or more of the switch assemblies described and/or illustrated herein, such as the switch assemblies 114, 700, 800, 1000, 1104, 1302 shown in FIGS. 1, 7, 8, 10, 11, and 13. The switch assemblies 1510 include the switches 510 (shown in FIG. 5) that control when different phases of the current received via the conductive pathways 1502, 1506, 1508 is conducted to different pumps 106. For example, the conductive pathway 1512 may be conductively coupled with a first pump 106 and the conductive pathway 1514 may be conductively coupled with a second pump 106. The switches 510 in the switch assembly 1510A may control when different phases of the current received from the power source 108 via the conductive pathways 1502, 1506 are conducted to the first pump 106 via the conductive pathway 1512, and the switches 510 in the switch assembly 1510B may control when different phases of the current received from the power source 108 via the conductive pathways 1502, 1508 are conducted to the second pump 106 via the conductive pathway 1514.

The connection assembly 1500 can reduce the length of conductive pathways needed to power the pumps 106 from the power source 108. Instead of having separate conductive pathways individually and separately extend from the power source 108 to each of the pumps 106, the connection assembly 1500 can allow for a single conductive pathway 1502 to extend from the power source 108 to a location near, but not to, the pumps 106, and then split the conductive pathway 1502 into shorter conductive pathways 1506, 1508, 1512, 1514 that extend to the pumps 106 via the switch assemblies 1510.

Figure 16:
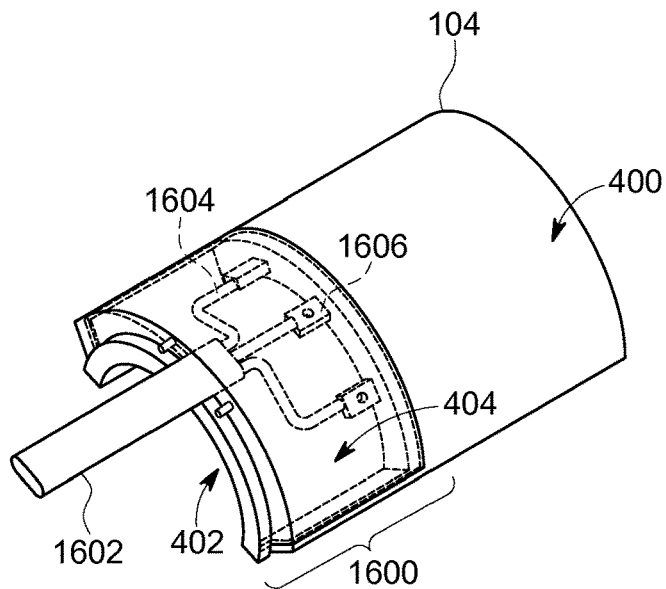
FIG. 16 illustrates a power supply connection assembly without a cover (shown in FIG. 17) according to one embodiment.
Figure 17:
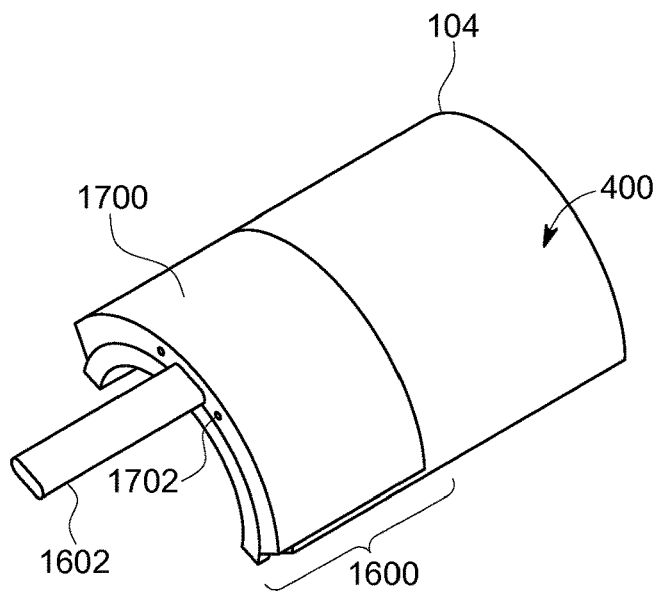
FIG. 17 illustrates the power supply connection assembly with the cover according to one embodiment.

FIG. 16 illustrates a power supply connection assembly 1600 without a cover 1700 (shown in FIG. 17) according to one embodiment. FIG. 17 illustrates the power supply connection assembly 1600 with the cover 1700 according to one embodiment. The connection assembly 1600 may conductively couple the power source 108 (shown in FIG. 1) with switch assemblies that are conductively coupled with the pumps 106 (shown in FIG. 1). The connection assembly 1600 may be operatively coupled with the pipe assembly 104. For example, the connection assembly 1600 may be connected with the pipe assembly 104 such that the connection assembly 1600 is in the interior chamber 404 (shown in FIG. 4) of the pipe assembly 104. In one aspect, the power supply connection assembly 1600 can represent the power supply connection assembly 1700 schematically shown in FIG. 17.

The connection assembly 1600 includes multiple conductive pathways 1604 that are conductively coupled with a conductive pathway 1602 that conducts current from the power source 108. The conductive pathway 1602 can represent the conductive pathway 112 shown in FIG. 1. The conductive pathways 1602 can represent cables, wires, busses, or other conductive bodies. While three conductive pathways 1602 are shown in FIG. 16, alternatively, the connection assembly 1600 may include a different number of conductive pathways 1602.

The connection assembly 1600 includes connectors 1606 that conductively couple the conductive pathways 1604 with switch assemblies, such as one or more of the switch assemblies described and/or illustrated herein, such as the switch assemblies 114, 700, 800, 1000, 1104, 1302, 1510 shown in FIGS. 1, 7, 8, 10, 11, 13, and 15. The switch assemblies are not visible in the views of FIGS. 16 and 17, but are disposed between the inner and outer walls 402, 400 of the pipe assembly 104.

The connection assembly 1600 is disposed within the interior chamber 404 of the pipe assembly 104, as shown in FIG. 16. After the connectors 1606 are connected to the conductive pathways 1604, the conductive pathways 1604 are connected with the conductive pathway 1602, and the connectors 1606 are connected with the switch assemblies, the cover 1700 may be placed over the connectors 1606 and conductive pathways 1604. The cover 1700 may be sealed to the pipe assembly 104 (e.g., hermetically sealed), and a sealing material (e.g., epoxy or another polymer) may be inserted into the interior chamber 404 beneath the cover 1700 through one or more openings 1702 extending into the interior chamber 404. The cover 1700 can mechanically secure the conductive pathways 1602, 1604 together and provide some relief to strain that is induced on the pipe assembly 104 during operation.

The connection assembly 1600 also can reduce the length of conductive pathways needed to power the pumps 106 from the power source 108. Instead of having separate conductive pathways individually and separately extend from the power source 108 to each of the pumps 106, the connection assembly 1600 can allow for a single conductive pathway 1602 to extend from the power source 108 to a location near, but not to, the pumps 106, and then split the conductive pathway 1602 into shorter conductive pathways that extend to the pumps 106 via the switch assemblies.

Figure 18:
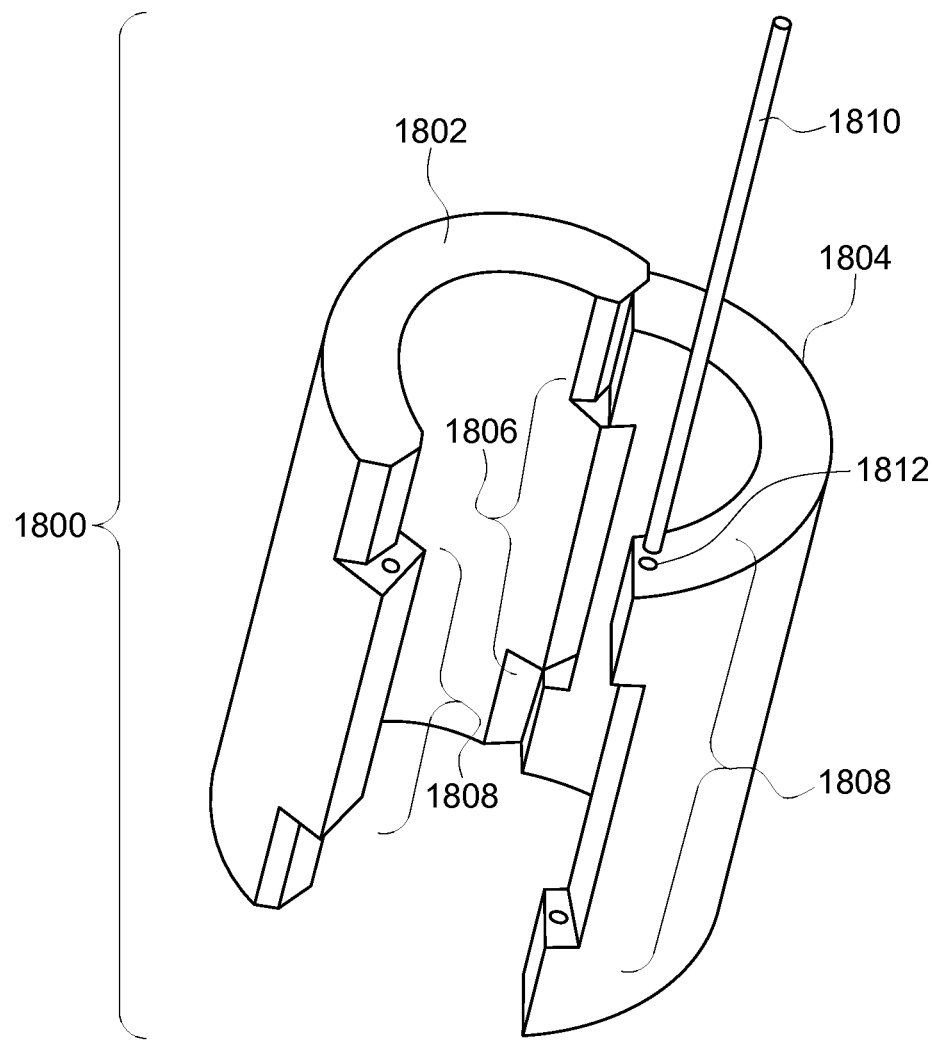
FIG. 18 illustrates an exploded view of a housing assembly according to one embodiment.
Figure 19:
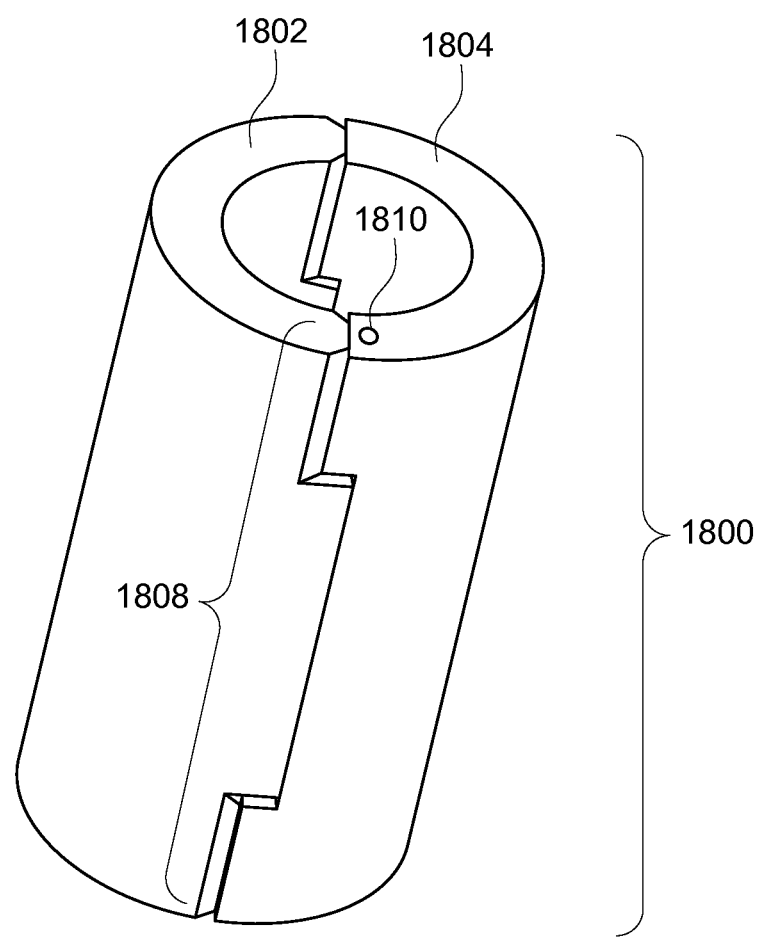
FIG. 19 illustrates a perspective view of the housing assembly shown in FIG. 18.

FIG. 18 illustrates an exploded view of a housing assembly 1800 according to one embodiment. FIG. 19 illustrates a perspective view of the housing assembly 1800 shown in FIG. 18. The housing assembly 1800 can hold one or more switch assemblies, as described above. In one embodiment, the housing assembly 1800 can represent a combination of the housings 1100, 1106 shown in FIG. 11. Alternatively, the housing assembly 1800 can represent one or more other housings described herein.

The housing assembly 1800 includes housing bodies 1802, 1804 that connect with each other to form the housing assembly 1800. The housing bodies 1802, 1804 can represent the housings 1100, 1106 or other housings described herein. Alternatively, more than two housing bodies 1802, 1804 may form the housing assembly 1800. The housing bodies 1802, 1804 are joined with each other by a hinge connection 1806. The housing bodies 1802, 1804 can pivot relative to each other about the hinge connection 1806 to separate the housing bodies 1802, 1804 from each other. The housing bodies 1802, 1804 may then be placed into the pipe assembly 104 (shown in FIG. 1), and then pivot back toward each other.

The housing bodies 1802, 1804 include a lock 1808 that secures the housing bodies 1802, 1804 to each other. The lock 1808 can include complementary shapes on the housing bodies 1802, 1804 that mesh with each other when the housing bodies 1802, 1804 pivot toward each other about the hinge connection 1806. In the illustrated embodiment, the lock 1808 includes openings 1812 in the housing bodies 1802, 1804 that are coaxial with each other when the housing bodies 1802, 1804 pivot toward each other and that are not coaxial with each other when the housing bodies 1802, 1804 pivot away from each other.

In order to secure the housing bodies 1802, 1804 on the pipe assembly 104, the housing bodies 1802, 1804 may pivot away from each other, be placed onto the pipe assembly 104, and then pivot toward each other until the portions of the lock 1808 in each of the housing bodies 1802, 1804 mesh with each other. A rod 1810 can then be inserted through the coaxial openings 1812 in the housing bodies 1802, 1804 to secure the housing bodies 1802, 1804 to each other.

Figure 20:
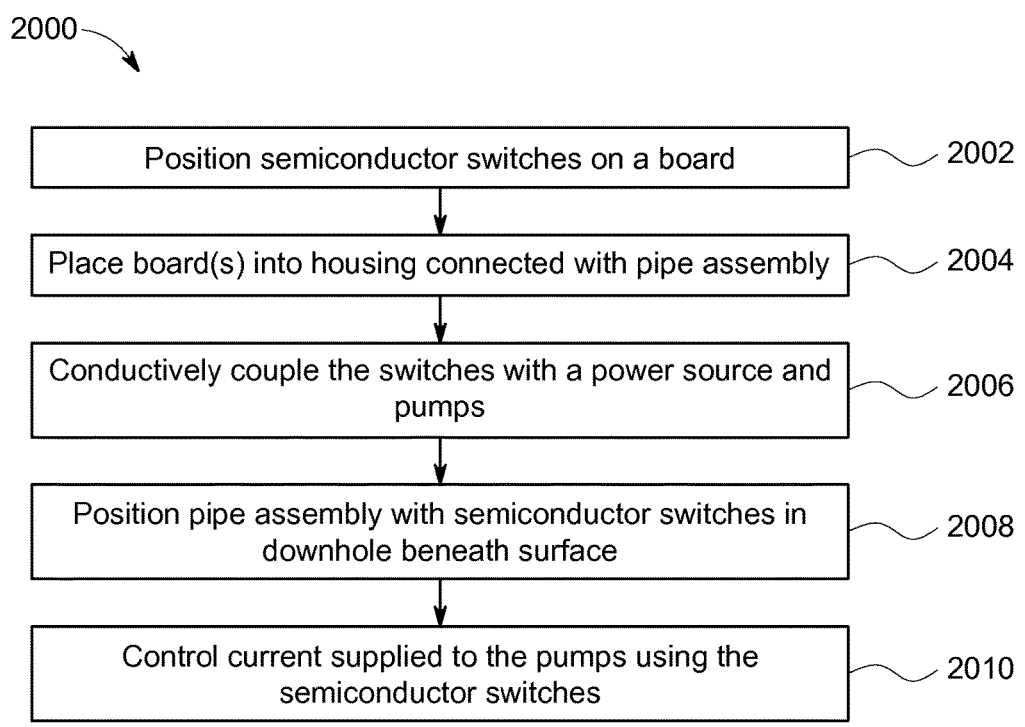
FIG. 20 illustrates a flowchart of one embodiment of a method for providing a downhole switch assembly.

FIG. 20 illustrates a flowchart of one embodiment of a method 2000 for providing a downhole switch assembly. The method 2000 may be used to provide one or more embodiments of the downhole systems and/or switch assemblies described herein. At 2002, semiconductor switches are positioned on one or more substrates. As described above, the switches may be silicon carbide switches positioned on substrates or foils that are interconnected with heat sinks. The switches may be positioned on the substrates such that the switches are far enough away from each other to avoid heating each other, while also allowing for a sufficient number of switch assemblies to fit around part or the entire circumference of the passageway in a pipe assembly that delivers resources from beneath the surface of the earth.

At 2004, the substrate(s) with the semiconductor switches are placed into a housing that is disposed within and/or connected with the pipe assembly. The substrates and semiconductor switches may be placed along an inner wall of the pipe assembly with heat sinks between the substrates and the inner wall to assist in transferring heat away from the semiconductor switches and into the passageway carrying resources through the pipe assembly.

At 2006, the switches are conductively coupled with a power source and pumps. The power source may be disposed at or above the surface, while the pumps are disposed well beneath the surface, such as several thousand feet or meters beneath the surface of the earth. The switches may be coupled with the power source by fewer conductive pathways (e.g., cables) than connect the switches to the pumps. This can reduce the length of cable used to power the pumps, as described above.

At 2008, the pipe assembly is positioned downhole in a well beneath the surface. The semiconductor switches may be located relatively far beneath the surface. For example, the semiconductor switches can be located closer to the pumps at or near the distal end of the pipe assembly than the surface. This depth can cause the semiconductor switches to be exposed to high temperatures and pressure, as described above. At 2010, current supplied to the pumps by the power source is controlled using the semiconductor switches. The semiconductor switches can separately control different phases of current to different pumps, as described above.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the particular arrangement of components (e.g., the number, types, placement, or the like) of the illustrated embodiments may be modified in various alternate embodiments. In various embodiments, different numbers of a given module, system, or unit may be employed, a different type or types of a given module, system, or unit may be employed, a number of modules, systems, or units (or aspects thereof) may be combined, a given module, system, or unit may be divided into plural modules (or sub-modules), systems (or sub-systems) or units (or sub-units), a given module, system, or unit may be added, or a given module, system or unit may be omitted.

As used herein, the term "computer," "controller," "system," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module," "system," or "computer."

The computer, module, system, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, system, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs, systems, or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are examples only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A downhole system comprising:
a first switch assembly that includes one or more solid state semiconductor switches configured to be disposed within a downhole pipe assembly, the one or more solid state semiconductor switches configured to operate in a closed state to conduct electric current supplied by a power source disposed above a surface to pumps disposed beneath the surface to cause the pumps to extract a resource from beneath the surface via the downhole pipe assembly, the one or more solid state semiconductor switches configured to operate in an open state to stop conducting the electric current from the power source to the pumps, wherein the first switch assembly is disposed within a housing configured to be coupled to an inner wall of the downhole pipe assembly, the housing including plural housing bodies configured to pivot toward or away from each other, the housing bodies configured to pivot away from each other in order to place the housing bodies around the downhole pipe assembly, the housing bodies configured to pivot toward each other to secure the housing bodies to the downhole pipe assembly.

2. The downhole system of claim 1, wherein the one or more solid state semiconductor switches are configured to independently control conduction of different phases of the electric current to the different pumps.

3. The downhole system of claim 1, wherein the one or more solid state semiconductor switches are configured to be coupled with the inner wall of the downhole pipe assembly that extends around a passageway through which the resource is pumped through the downhole pipe assembly, the one or more solid state semiconductor switches configured to be coupled with the inner wall by at least a heat sink to transfer heat from the one or more solid state semiconductor switches to the passageway of the downhole pipe assembly.

4. The downhole system of claim 1, wherein the one or more solid state semiconductor switches are arranged in a grid formed by plural columns and plural rows of the one or more solid state semiconductor switches on a substrate that is configured to be disposed within the downhole pipe assembly.

5. The downhole system of claim 1, wherein the one or more solid state semiconductor switches are arranged in plural columns on a substrate that is configured to be disposed within the downhole pipe assembly with at least one of the columns of the one or more solid state semiconductor switches disposed closer to an upper end of the substrate than one or more other columns of the one or more solid state semiconductor switches.

6. The downhole system of claim 1, wherein the one or more solid state semiconductor switches are arranged in plural columns on plural separate substrates disposed along a length of the downhole pipe assembly with the one or more solid state semiconductor switches and the substrates conductively coupled with each other by one or more conductive pathways.

7. The downhole system of claim 1, wherein the one or more solid state semiconductor switches include silicon carbide switches.

8. The downhole system of claim 1, wherein the one or more solid state semiconductor switches are configured to provide bi-directional conduction of the electric current between the power source and the pumps and are configured to provide bi-directional voltage blocking capability between the power source and the pumps.

9. The downhole system of claim 1, further comprising:
a second switch assembly including one or more solid state semiconductor switches configured to be disposed within the downhole pipe assembly and to control conduction of the electric current between the power source and the pumps; and
a power supply connection assembly configured to conductively couple the power source with the one or more solid state semiconductor switches in the switch assembly, the power supply connection assembly including a splitting device configured to be conductively coupled with a power source conductive pathway that is connected with the power source and configured to conductively couple the power source conductive pathway with different first and second conductive pathways, the first conductive pathway configured to be conductively coupled with the first switch assembly, the second conductive pathway configured to be conductively coupled with the second switch assembly.

10. The downhole system of claim 9, wherein the first and second switch assemblies and the power supply connection assembly are configured to be disposed in the downhole pipe assembly that extends below a surface of earth.

11. The downhole system of claim 10, wherein the power supply connection assembly is configured to be disposed within an interior chamber of the downhole pipe assembly with an exterior cover of the downhole pipe assembly enclosing the power supply connection assembly in the interior chamber.

12. A system comprising:
plural switch assemblies configured to be disposed within a downhole pipe assembly, the switch assemblies including one or more solid state semiconductor switches disposed on plural substrates and configured to operate in a closed state to conduct electric current supplied by a power source disposed above a surface to pumps disposed beneath the surface to cause the pumps to extract a resource from beneath the surface via the downhole pipe assembly, the one or more solid state semiconductor switches configured to operate in an open state to stop conducting the electric current from the power source to the pumps, wherein the plural switch assemblies are disposed within a housing configured to be coupled to an inner wall of the downhole pipe assembly, the housing including plural housing bodies configured to pivot toward or away from each other, the housing bodies configured to pivot away from each other in order to place the housing bodies around the downhole pipe assembly, the housing bodies configured to pivot toward each other to secure the housing bodies to the downhole pipe assembly.

13. The system of claim 12, wherein the one or more solid state semiconductor switches of the switch assemblies are configured to independently control conduction of different phases of the electric current to the different pumps such that the different switch assemblies separately control the conduction of the different phases to the pumps.

14. The system of claim 12, wherein the switch assemblies are configured to be coupled with the inner wall of the downhole pipe assembly that extends around a passageway through which the resource is pumped through the downhole pipe assembly, the switch assemblies configured to be coupled with the inner wall by at least a heat sink to transfer heat from the one or more solid state semiconductor switches to the passageway of the downhole pipe assembly.

15. The system of claim 14, wherein the switch assemblies are configured to be coupled with no more than one half of a total circumference of the inner wall of the downhole pipe assembly.

16. The system of claim 14, wherein the switch assemblies are configured to be coupled with the inner wall of the downhole pipe assembly over more than half of a total circumference of the inner wall.

17. The system of claim 12, wherein each of the switch assemblies includes a different group of the switches, and wherein each of the different groups of the switches is configured to control conduction of a different phase of the electric current to one or more of the pumps.

18. The system of claim 12, wherein the one or more solid state semiconductor switches are disposed onboard separate substrates and include gates, drains, and sources, and wherein two or more of the gates, drains, and sources of two or more of the switches are conductively coupled by conductive foils.

19. A system comprising:
plural switch assemblies configured to be disposed within a downhole pipe assembly having a passageway through which a resource is pumped from beneath a surface, the switch assemblies including one or more solid state semiconductor switches configured to operate in a closed state to conduct electric current supplied by a power source disposed above the surface to pumps disposed beneath the surface to cause the pumps to extract the resource from beneath the surface via the passageway, the one or more switches configured to operate in an open state to stop conducting the electric current from the power source to the pumps, wherein the switch assemblies are connected with an inner wall of the downhole pipe assembly by heat sinks to transfer heat from the switches to the passageway of the downhole pipe assembly, wherein the plural switch assemblies are disposed within a housing configured to be coupled to the inner wall of the downhole pipe assembly, the housing including plural housing bodies configured to pivot toward or away from each other, the housing bodies configured to pivot away from each other in order to place the housing bodies around the downhole pipe assembly, the housing bodies configured to pivot toward each other to secure the housing bodies to the downhole pipe assembly.

20. The system of claim 19, wherein the one or more solid state semiconductor switches of the switch assemblies are configured to independently control conduction of different phases of the electric current to the different pumps such that the different switch assemblies separately control the conduction of the different phases to the pumps.

21. The system of claim 19, wherein the switch assemblies are configured to be coupled with no more than one half of a total circumference of the inner wall of the downhole pipe assembly.

22. The system of claim 19, wherein each of the switch assemblies includes a different group of the switches, and wherein each of the different groups of the switches is configured to control conduction of a different phase of the electric current to one or more of the pumps.

* * * * *